No. 745,921. PATENTED DEC. 1, 1903.
G. STADE.
APPARATUS FOR EVAPORATING LIQUIDS.
APPLICATION FILED FEB. 4, 1903.
NO MODEL. 2 SHEETS—SHEET 2.

No. 745,921.

Patented December 1, 1903.

UNITED STATES PATENT OFFICE.

GEORGE STADE, OF GROSS WUSTERWITZ, GERMANY.

APPARATUS FOR EVAPORATING LIQUIDS.

SPECIFICATION forming part of Letters Patent No. 745,921, dated December 1, 1903.

Application filed February 4, 1903. Serial No. 141,895. (No model.)

*To all whom it may concern:*

Be it known that I, GEORGE STADE, civil engineer, a subject of the King of Prussia, Emperor of Germany, and a resident of Gross Wusterwitz, Germany, (whose post-office address is 7ª Kanalstrasse, Gross Wusterwitz, Germany,) have invented certain new and useful Improvements in and Relating to Apparatus for Evaporating Liquids; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in apparatus for evaporating sugar solutions and other liquids; and the invention consists in providing a vessel with one or more heating bodies or elements of annular shape, said heating-bodies having upper and lower heating-surfaces and oblique heating-tubes.

The invention also consists in arranging such annular heating bodies or elements in an inclined position with reference to the horizontal plane in such a manner that the water of condensation within the heating bodies or elements can with ease run to the deepest point of the inclined bottom of the heating body or element, from which it is drawn in the usual manner. The heating bodies or elements may be either constructed originally so that one side of their bottoms has a deeper position than the other or they may be adjusted within the evaporating vessel in such a manner that their bottoms have an inclined position. In case two or more heating bodies or elements being employed they may either be arranged uniformly or reversed, so that the inclined heating-surfaces of the several bodies are parallel or at an angle.

The invention consists, further, in providing such annular heating bodies or elements with inclined bottoms with air and gas discharging pipes, as will be described more particularly hereinafter.

The invention consists, further, in combining the annular heating bodies or elements with inclined bottoms with a telescopically-adjustable central circulation-pipe, the lower end of which is attached to the opening in the middle of the lower heating body or element, the upper end of which is below the level of the evaporating liquid.

Figure 1:
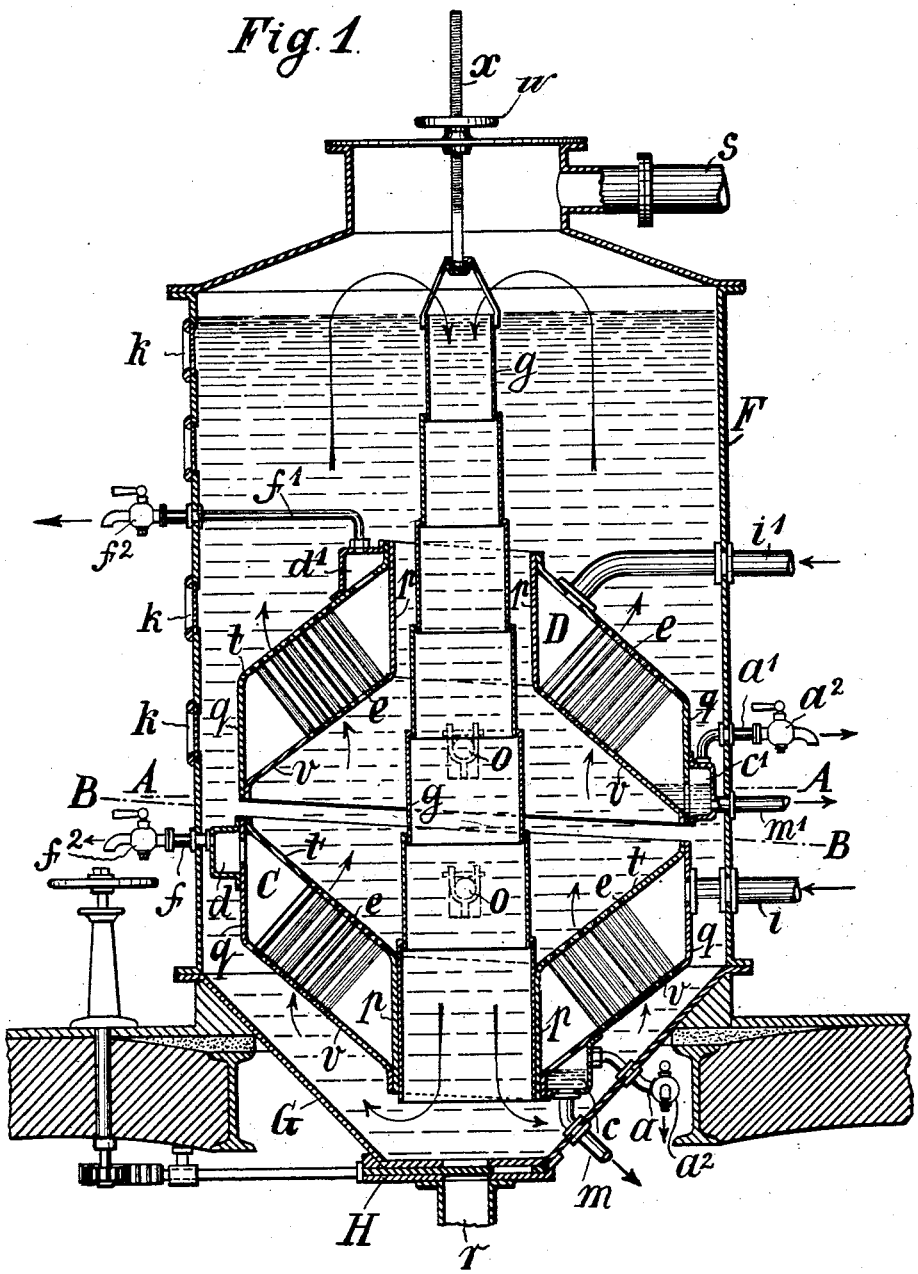
Figure 2:
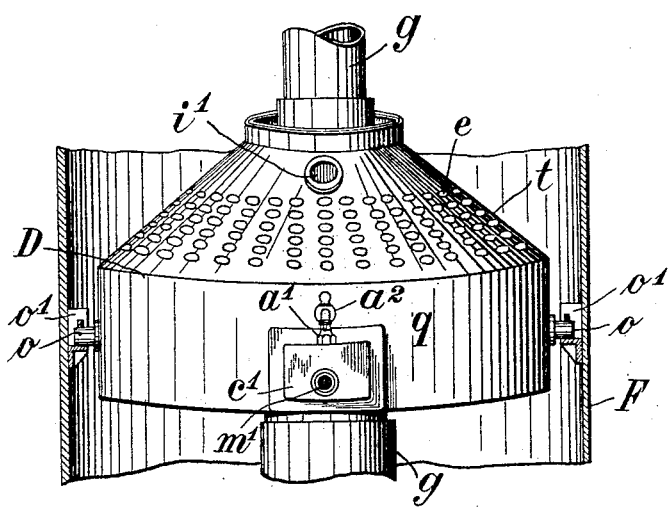

In the accompanying drawings, Figure 1 is a longitudinal vertical section of an apparatus for carrying out the invention. Fig. 2 is a detail side view of the upper heating-body, and Fig. 3 a top view of Fig. 2.

F designates the evaporating vessel of the usual cylindrical form, provided with means (not shown) for introducing the liquid to be evaporated, a conical bottom G, and a valve H for extracting the liquid after evaporating by means of the pipe $r$. The upper end of this vessel is provided with a pipe for the escape of the steam developed from the evaporating liquid. In the cylindrical shell of the evaporating vessel sight-glasses K are arranged, as usual.

Within the evaporating vessel are arranged heating-bodies C and D, each consisting of two cylindrical parts $p$ and $q$ and two conical parts $t$ and $v$, joined by riveting or in other suitable manner. In the conical parts $t$ and $v$ of the heating bodies or elements the ends of the heating-tubes $e$ are fixed, having an oblique position, as clearly shown in Fig. 1 of the drawings.

Figure 3:
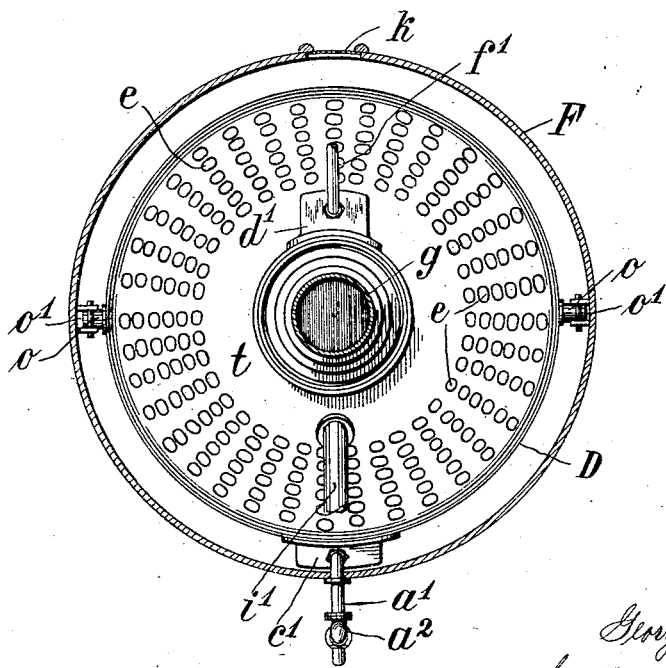

The heating-bodies C and D may be fixed within the evaporating vessel F by any suitable means known in the art; but I prefer to provide the outer cylindrical parts of the heating bodies or elements with pinions $o$, Figs. 2 and 3, adapted to be supported by suitable bearings $o'$, fixed on the cylindrical shell of the evaporating vessel F. The heating bodies C and D shown in the drawings have inversed conical parts $t$ and $v$, the largest part of the body D being situated below and the largest part of the body C situated above, as shown clearly in Fig. 1. All heating bodies or elements used in the same apparatus may have the same shape—*i. e.*, either that of the body C or that of the body D. The principal part of my invention consists in arranging these heating bodies or elements in such a manner that their bottoms—*i. e.*, the circles in which the conical parts $v$ are united with the adjacent cylindrical parts $q$ or $p$—have an inclined position with reference to the horizontal plane marked by line A A, the inclined position of the bottom being marked by the line B B. By this means one side of the bottom, as shown in Fig. 1 the right-hand side, has a lower position than the other side, so that the water condensed from the heating-steam within the heating bodies or elements will run easily to this lower point of the bottom. At this lowest point of the inclined bottom of the heating bodies or elements outlet-pipes $m$ and $m'$ are arranged in a small chamber $c$ and $c'$, communicating with the interior of the heating bodies or elements for the purpose of letting escape the water condensed from the heating-steam. Steam is introduced into the heating bodies or elements by tubes $i$ and $i'$ in the usual manner. At the highest points of the heating-bodies and opposite the points where the outlet-pipes $m$ and $m'$ are arranged are provided gas-pipes $f f'$ by means of small chambers $d\ d'$. By these pipes $f$ and $f'$ light gases that may be contained in the steam, as ammoniacal gas and the like, may escape by opening the valves $f^2$ from time to time whenever they accumulate in such a quantitity that the heating by the steam is prevented. In a similar manner at the lower parts of the heating bodies or elements pipes $a$ and $a'$ are provided above the water-discharge pipes $m$ and $m'$ either directly or by means of the small chambers $c$ and $c'$, by which air may be drawn off by opening the valves $a^2$ from time to time.

Through the central openings of the annular heating bodies or elements a telescopically-adjustable central circulation-pipe $g$ is passed, the lower end of which is attached to the cylindrical part $p$ of the lower annular heating body C, while the upper end may be lowered or raised by means of the long screw-rod $x$ and hand-wheel $w$.

The mode of evaporating sugar solutions or other liquids by this apparatus may be described as follows: The evaporating vessel F being filled in the usual manner with the liquid to be evaporated and then evacuated by a vacuum-pump connected to pipe $s$, as known to those skilled in the art, steam is admitted to the heating bodies or elements C and D by pipes $i$ and $i'$, the valves $a^2$ and $f^2$ being opened until all gases and air have escaped from the interior of the heating bodies or elements C and D. Then the valves $a^2$ and $f^2$ are closed. The steam introduced into the heating-bodies C and D in heating the solution or liquid will be condensed, and the condensed water will accumulate in the lower parts of the heating bodies or elements C and D. In view of the inclined position of the bottoms of the heating bodies or elements this water of condensation will easily run to the lowest parts—i. e., the small chambers $c$ and $c'$—from which it escapes in the usual manner through the pipes $m$ and $m'$. From time to time the valves $a^2$ and $f^2$ are opened to let escape air and gases which may be accumulated within the heating-bodies. The valves $a^2$ and $f^2$ are closed as soon as steam escapes from the pipes $a$, $a'$, $f$, and $f'$. The solution to be evaporated is heated by the heating surfaces and tubes of the bodies or elements C and D, and increased circulation is imparted to the liquid during its evaporation by the telescopically-adjustable central circulation-pipe, as shown by arrows, the upper end of the pipe $a$ being arranged somewhat below the level of the liquid and lowered by means of the screw-spindle $x$ and hand-wheel $w$, according to the sinking of the level of the supporting liquid, so that the crystals formed within the solution come into contact always with other portions of the mother-lye and the layer of mother-lye surrounding the crystals is continually separated therefrom within the central circulation-pipe. By this means, therefore, an effective use as possible is made of the heating surface and steam and the greatest possible circulation of liquid to be evaporated, together with a very effective transmission of heat.

Having thus described my invention, what I claim as new therein, and desire to secure by Letters Patent, is—

1. An evaporating apparatus comprising a vessel, and conical heating-bodies mounted therein, the bottoms of which are inclined to the horizontal plane, substantially as and for the purpose specified.

2. An evaporating apparatus for sugar solutions and other liquids comprising an evaporating vessel, annular heating-bodies having a cylindrical portion and conical inclined bottoms, the circles in which the conical bottoms are united with the adjacent cylindrical parts being arranged in a position inclined to the horizontal plane, substantially as described.

3. An evaporating apparatus for sugar solutions and other liquids comprising an evaporating vessel, annular heating-bodies having a cylindrical portion and conical inclined bottoms, the circles in which the conical bottoms are united with the adjacent cylindrical parts being arranged in a position inclined to the horizontal plane, and condensing-water-discharge pipes provided at the lowest points of the heating body or element, substantially as described.

4. An evaporating apparatus for sugar solutions and other liquids comprising an evaporating vessel, annular heating-bodies having a cylindrical portion and conical inclined bottoms, the circles in which the conical bottoms are united with the adjacent cylindrical parts being arranged in a position inclined to the horizontal plane, water-discharge pipes, and air-discharge pipes provided at the lowest points on the heating-bodies, substantially as described.

5. An evaporating apparatus for sugar solutions and other liquids comprising an evaporating vessel, annular heating-bodies having cylindrical portions and conical inclined bottoms, the circles in which the conical bottoms are united with the adjacent cylindrical parts being arranged in a position inclined to the horizontal plane, water-discharge pipes and air-discharge pipes provided at the lowest points of the heating-bodies, and gas-pipes provided at the highest points of the heating bodies or elements, substantially as described.

6. An evaporating apparatus for sugar solutions and other liquids comprising an evaporating vessel, annular heating-bodies having cylindrical portions and conical inclined bottoms, the circles in which the conical bottoms are united with the adjacent cylindrical parts being arranged in a position inclined to the horizontal plane, water-discharge pipes and air-discharge pipes provided at the lowest points of the heating-bodies, gas-pipes provided at the highest points of the heating-bodies and oblique heating-tubes in said heating-bodies, substantially as described.

7. An evaporating apparatus for sugar solutions and other liquids comprising an evaporating vessel, annular heating-bodies having cylindrical portions and conical inclined bottoms, the circles in which the conical bottoms are united with the adjacent cylindrical parts being arranged in a position inclined to the horizontal plane, water-discharge pipes and air-discharge pipes provided at the lowest points of the heating-bodies, gas-pipes provided at the highest points of the heating-bodies, oblique heating-tubes in said heating-bodies and a telescopically-adjustable central circulation-pipe, substantially as described.

In testimony that I claim the foregoing as my invention I have signed my name in presence of two subscribing witnesses.

GEORGE STADE.

Witnesses:
WOLDEMAR HAUPT,
HENRY HASPER.